United States Patent [19]
Aron

[11] 3,740,890
[45] June 26, 1973

[54] FISH HOOK

[76] Inventor: Francis J. Aron, 186 Orchid Drive, Mastic Beach, N.Y. 11951

[22] Filed: May 6, 1971

[21] Appl. No.: 140,800

[52] U.S. Cl. .................................................. 43/37
[51] Int. Cl. ............................................. A01k 83/00
[58] Field of Search .......................... 43/37, 34, 89

[56] References Cited
UNITED STATES PATENTS

| | | | |
|---|---|---|---|
| 280,610 | 7/1883 | Greer | 43/37 |
| 426,027 | 4/1890 | Lathrop | 43/37 |
| 984,963 | 2/1911 | Paysen | 43/37 |
| 1,608,631 | 11/1926 | Stevenson | 43/37 |

Primary Examiner—Warner H. Camp

[57] ABSTRACT

An elongated shank member has a first hook extending from one end and an aperture adjacent its other end for pivotally receiving an elonated spring. The spring has arms which embrace side portions of the shank and the arms are releasably held in this position by projections on the shank. A second hook is pivotally connected to the shank for swinging the shank and first hook about the spring pivot when the same is tensioned by fish.

1 Claim, 3 Drawing Figures

PATENTED JUN 26 1973　　　　　　　　　　　3,740,890

INVENTOR.
FRANCIS J. ARON

FISH HOOK

This invention relates to fishing tackle, and more particularly to a double-acting fish hook.

It is a primary purpose of this invention to provide a fish hook which will have a main hook for placing bait upon, pivotably secured within a flat member having a second hook fixedly secured thereto for also engaging the fish in order to prevent the fish from releasing itself from the first hook, that one being the pivotable one.

Another object of this invention is to provide a double-acting fish hook, one of which is stationary to a brass shank portion while the other is pivotable and carried by the shank and when the fish grasps the pivotable hook having the bait thereon, the shank carrying the stationary hook will pivot the stationary hook so that it will engage hookingly the upper portion of the fish's mouth.

A further object of this invention is to provide a hook device of which the brass shank has pivotably attached to it a spring member which engages a convex portion of the body of the shank so as to keep the hook that is stationary of the shank, away from the pivotable bait containing hook until the fish strikes the baited hook and the tension caused thereby will enable the spring portion attached to the swivel, to overcome the convex portion of the shank and thus allow the hook stationary within the shank to pivot downwards so as to quickly hook into the upper portion of the fish's mouth.

A still further object of this invention is to provide a fish hook device of which the bait containing hook may be removed and replaced with a lure and the device is adaptable for trolling or fishing on the bottom and the device is also suitable for salt or fresh water application.

Other objects of the present invention are to provide a fish hook which is simple in design, inexpensive to manufacture, rugged in construction, easy to use and efficient in operation.

These and other objects will be readily evident upon a study of the following specification and the accompanying drawing wherein.

Figure 1:
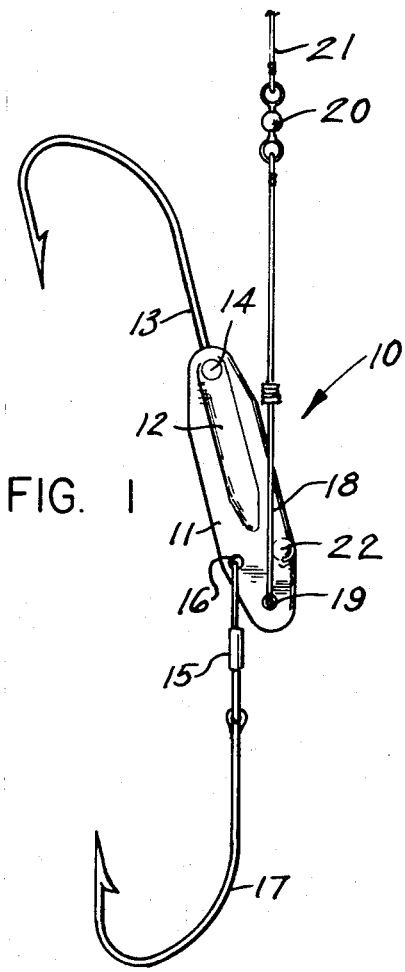
FIG. 1 is a side view of the present invention shown in elevation with the hooks held apart from each other.
Figure 2:
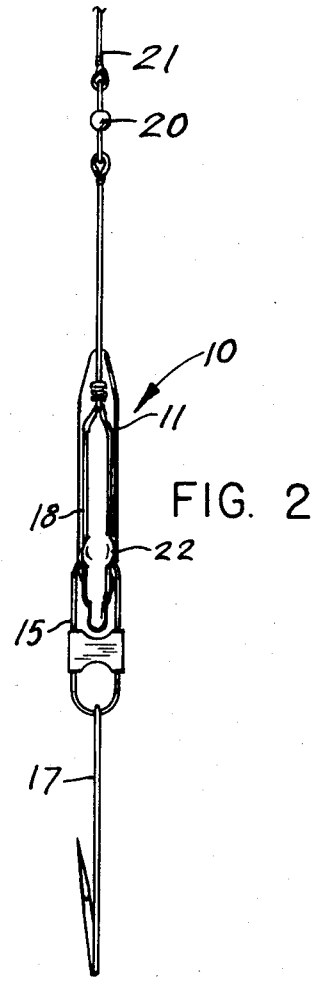
FIG. 2 is an edge-wise view of FIG. 1.
Figure 3:
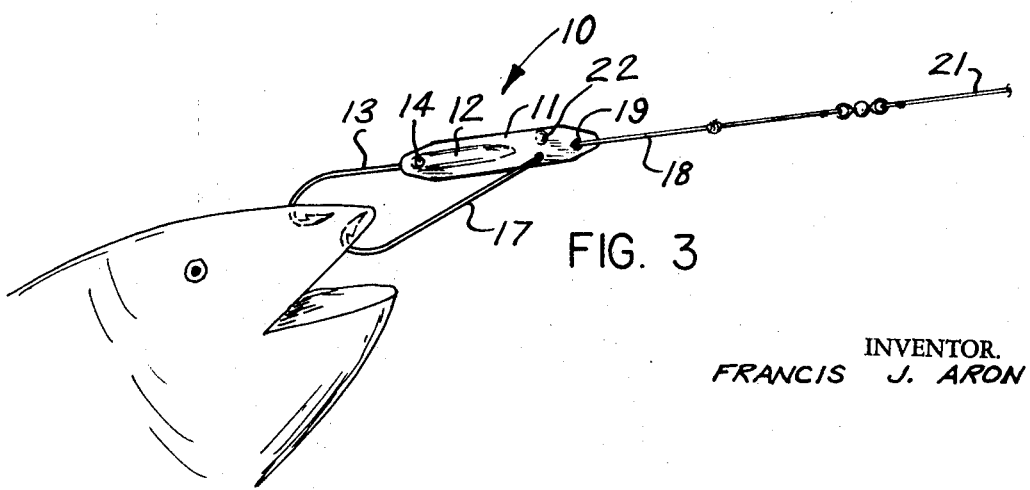
FIG. 3 is a side view of the present invention shown engaging the fish's mouth.

According to this invention, a fish hook device 10 is shown to include a brass shank 11 having a raised rib portion 12 which imparts greater strength and rigidity to shank 11.

Extending from shank 11 is a stationary hook 13 which is held fixedly to one end of shank 11 by means of a rivet fastener 14.

A snap member 15 is freely carried within opening 16 of shank 11 and snap member 15 freely engages hook 17 upon which bait is placed.

A spring portion 18 is pivotably carried within opening 19 at one end of shank member 11 and the spring portion 18 is secured to a swivel 20 attached to fishing line 21.

A convex portion 22 on each side of shank 11 serves to engage the spring member 18 in order to prevent hook 13 and the shank 11 from pivoting towards the hook 17 until tension is placed upon hook 17.

When a fish bites on the hook 17, the lever action effected by the tension created, will cause spring member 18 to override the convex portions 22 of shank 11 and thus forcibly pivot the shank 11 so that the hook 13 will engage the top of the fish's mouth in order that the fish will be double hooked.

In order to provide more tension upon spring member 18 the side arms thereof may be pressed together along the sides of shank 11 and if less tension is desired the sides of spring member 18 are pulled outwards with the fingers lightly so as to cause a more readily engaging action of hook 13 when the bite of the fish is small thus creating less tension for activating device 10 by the disengagement of spring member 18 from the convex portions 22 of shank 11.

What I claim is:

1. A fish hook, comprising in combination, an elongated brass shank which at one end thereof has a stationary hook member affixed thereto, an opposite end of said shank having a transverse opening therethrough, one end of a spring member being fitted pivotally free in said transverse opening said spring member being of elongated loop shape and accordingly including parallel spaced apart opposite side legs each one of which is adjacent an opposite side face of said shank, each of said side faces of said shank having an outwardly extending protrusion located to one side of a longitudinal axis extended between said opening and an opposite end of said shank, an opposite end of said spring member being secured to a fishing line, a second transverse opening through said shank being located through a portion of said shank which is opposite from said axis to which said protrusions are located, said second opening supporting pivotally free a second hook member, and said spring member being adaptable to snap over the outer ends of said protrusions when there is a pulling force by a fish on the said second hook member, thereby causing said shank to pivot about the first said opening so to bring said stationary hook member against said fish.

* * * * *